United States Patent
Ueo et al.

(10) Patent No.: US 10,696,179 B2
(45) Date of Patent: Jun. 30, 2020

(54) ELECTRICALLY POWERED VEHICLE

(71) Applicant: Toyota Jidosha Kabushiki Kaisha, Toyota-shi, Aichi-ken (JP)

(72) Inventors: Daisuke Ueo, Nagoya (JP); Keisuke Kanamaru, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 435 days.

(21) Appl. No.: 15/783,521

(22) Filed: Oct. 13, 2017

(65) Prior Publication Data
US 2018/0118037 A1    May 3, 2018

(30) Foreign Application Priority Data
Oct. 27, 2016   (JP) .................. 2016-210815

(51) Int. Cl.
*B60L 50/50*   (2019.01)
*B60L 53/14*   (2019.01)
(Continued)

(52) U.S. Cl.
CPC .............. *B60L 50/50* (2019.02); *B60L 1/006* (2013.01); *B60L 53/14* (2019.02); *B60L 58/12* (2019.02); *B60W 50/04* (2013.01); *B60L 58/30* (2019.02); *B60L 2210/40* (2013.01); *B60L 2250/16* (2013.01); *Y02T 10/705* (2013.01);
(Continued)

(58) Field of Classification Search
CPC .... B60L 1/00; B60L 1/006; B60L 3/00; B60L 50/50; B60L 53/14; B60L 58/12; B60L 58/30; B60L 2210/40; B60L 2250/16; B60W 50/04
See application file for complete search history.

(56) References Cited

U.S. PATENT DOCUMENTS

| | | | |
|---|---|---|---|
| 2012/0245794 A1* | 9/2012 | Aragai ................ | H02J 1/14 701/36 |
| 2013/0231811 A1 | 9/2013 | Aoki | |
| 2016/0137070 A1* | 5/2016 | Yumita ................ | H02M 3/04 307/10.1 |

FOREIGN PATENT DOCUMENTS

| JP | 2004-048900 A | 2/2004 |
|---|---|---|
| JP | 2004048900 A * | 2/2004 |

(Continued)

OTHER PUBLICATIONS

English translation for the reference JP2004048900 (Year: 2004).*
(Continued)

*Primary Examiner* — Rachid Bendidi
(74) *Attorney, Agent, or Firm* — Dinsmore & Shohl LLP (57) ABSTRACT

An electrically powered vehicle includes a power supply device, a first outlet, a second outlet, and an electronic control unit. The first outlet configured to be connected to an external equipment that is not constituent equipment of the electrically powered vehicle. The second outlet is configured to be connected to an external equipment that is not constituent equipment of the electrically powered vehicle. While first power feed and second power feed are being executed simultaneously, in a case where first power feed electric power exceeds a first threshold or in a case where total electric power of the first power feed and the second power feed exceeds a second threshold, the electronic control unit is configured to temporarily stop the second power feed and continue the first power feed.

6 Claims, 8 Drawing Sheets

(51) Int. Cl.
*B60L 58/12* (2019.01)
*B60L 1/00* (2006.01)
*B60W 50/04* (2006.01)
*B60L 58/30* (2019.01)

(52) U.S. Cl.
CPC ........ *Y02T 10/7044* (2013.01); *Y02T 10/7072* (2013.01); *Y02T 10/92* (2013.01); *Y02T 90/14* (2013.01); *Y02T 90/34* (2013.01)

(56) References Cited

FOREIGN PATENT DOCUMENTS

| | | | |
|---|---|---|---|
| JP | 2008-001316 A | | 1/2008 |
| JP | 2008001316 A | * | 1/2008 |
| JP | 2012-200100 A | | 10/2012 |
| JP | 2013-183525 A | | 9/2013 |
| JP | 2015133769 A | * | 7/2015 |
| JP | 2015133769 A | | 7/2015 |
| JP | 2016-096629 A | | 5/2016 |

OTHER PUBLICATIONS

English translation for the reference JP2008001316 (Year: 2008).*
English translation for the reference JP2015133769 (Year: 2015).*
U.S. Patent Application filed U.S. Appl. No. 15/723,617, filed Oct. 3, 2017; Inventor(s):Daisuke Ueo et al.

* cited by examiner

ELECTRICALLY POWERED VEHICLE

INCORPORATION BY REFERENCE

This application claims priority to Japanese Patent Application No. 2016-210815 filed on Oct. 27, 2016, the entire contents of which are incorporated herein by reference.

BACKGROUND

1. Technical Field

The present disclosure relates to an electrically powered vehicle and in particular, to an electrically powered vehicle configured to perform power feed to electrical equipment (hereinafter also referred to as "external equipment") that is not constituent equipment of the electrically powered vehicle.

2. Description of Related Art

In an electrically powered vehicle (an electric vehicle, a hybrid vehicle, a fuel cell vehicle, or the like) capable of traveling using an electric motor, in general, an electric power storage device (a battery or the like) that stores electric power for driving the electric motor is mounted. In a hybrid vehicle and a fuel cell vehicle, in general, an electric power generation device (a generator a fuel cell, or the like) is also mounted in addition to the electric power storage device.

Among electrically powered vehicles, there is an electrically powered vehicle that is configured to be executable power feed (hereinafter, referred to as "external power feed") from one or both (hereinafter, referred to as "power supply device") of an in-vehicle electric power storage device and an electric power generation device to external equipment. For example, Japanese Unexamined Patent Application Publication No. 2013-183525 (JP 2013-183525 A) discloses a hybrid vehicle in which, as an outlet for external power feed, a service outlet (AC outlet) capable of feeding small electric power is provided in a vehicle cabin.

SUMMARY

Among electrically powered vehicles, there is an electrically powered vehicle that is configured to be executable, as external power feed, large electric power feed for housing or the like in addition to small electric power feed for a service outlet in a vehicle cabin disclosed in JP 2013-183525 A.

In an electrically powered vehicle capable of external power feed, in general, an output upper limit value as the whole of an external power feed device is set. The output upper limit value of the entire device can be determined in advance, for example, in consideration of legal regulations or the like.

In an electrically powered vehicle that is executable large electric power feed and small electric power feed, in a case where large electric power feed and small electric power feed are executed simultaneously, in a state in which an output of large electric power feed is small, an output (a total output of large electric power feed and small electric power feed) of the entire device becomes less than the output upper limit value of the entire device. However, in a state in which the output of large electric power feed is large, there is a possibility that the output of the entire device exceeds the outer upper limit value of the entire device. In a case where the output of the entire device exceeds the output, upper limit value of the entire device, the output of large electric power feed is limited, and a situation may occur in which power failure occurs in housing or the like that is a supply destination of large electric power feed.

The present disclosure relates to an electrically powered vehicle that is executable first power feed capable of outputting large electric power and second power feed capable of outputting small electric power simultaneously, and sufficiently secure electric power of the first power feed.

An aspect of the present disclosure relates to an electrically powered vehicle including a power supply device, a first outlet, a second outlet, and an electronic control unit. The first outlet is configured to be connected to an external equipment that is not constituent equipment of the electrically powered vehicle. The second outlet is configured to be connected to an external equipment that is not constituent equipment of the electrically powered vehicle. The electronic control unit is configured to execute first power feed for performing a control such that the power supply device feeds electric power from the power supply device to the external equipment connected to the first outlet. The electronic control unit is configured to execute second power feed for performing a control such that the power supply device feeds electric power from the power supply device to the external equipment connected to the second outlet. The maximum electric power of the second power feed is smaller than the maximum electric power of the first power feed. The electronic control unit is configured to, in a case where a first condition or a second condition is established while the first power feed and the second power feed are being executed, perform a control such that the power supply device stops the second power feed and continues the first power feed. The first condition is a condition is a electric power of the first power feed exceeds a first threshold. The second condition is a condition that total electric power of the first power feed and the second power feed exceed a second threshold.

According to the aspect of the present disclosure, while the first power feed capable of outputting large electric power and the second power feed capable of outputting small electric power are being executed simultaneously, in a case where the electric power of the first power feed exceeds the first threshold or in a ease where the total electric power of the first power feed and the second power feed exceeds the second threshold, the second power feed is stopped, and the first power feed is continued. In this way, the first power feed capable of outputting large electric power is given priority with the second power feed, whereby it is possible to sufficiently secure the electric power of the first power feed and to suppress a situation in which power failure occurs in housing or the like that is a supply destination of the first power feed.

The electrically powered vehicle according to the aspect of the present disclosure may further include a display device configured to display an image. In a case where the first condition or the second condition is established and the second power feed is stopped, the electronic control unit may be configured to perform a control such that the display device displays an image indicating that the second power feed is stopped.

According to the aspect of the present disclosure, the image indicating that the second power feed is stopped is displayed on the display device. With this, it is possible to allow a user inside a vehicle cabin to confirm the display device to ascertain that the second power feed is stopped.

The electrically powered vehicle according to the aspect of the present disclosure may further include a communication device configured to execute communication with a portable terminal earned by a user. In a case where the first condition or the second condition is established and the second power feed is stopped, the electronic control unit may be configured to perform a control such that the communication device transmits, to the portable terminal, information for giving the user notification that the second power feed is stopped.

According to the aspect of the present disclosure, in a case where the second power feed is stopped, information for giving the user notification that the second power feed is stopped is transmitted to the portable terminal carried by the user. With this, it is possible to give even a user outside the vehicle cabin notification that the second power feed is stopped.

In the electrically powered vehicle according to the aspect of the present disclosure, in a case where the communication device receives, from the portable terminal, information indicating that the user requests to decrease the electric power of the first power feed, the electronic control unit may be configured to perform a control such that the power supply device decreases the electric power of the first power feed. In a case where the electric power of the first power feed decreases to be less than the first threshold while the second power feed is stopped with the establishment of the first condition, the electronic control unit may be configured to perform a control such, that the power supply device restarts the second power feed while continuing the first power feed.

According to the aspect of the present disclosure, the user operates the portable terminal inside or outside the vehicle cabin, thereby decreasing the electric power of the first power feed to be less than the first threshold and restarting the second power feed.

In the electrically powered vehicle according to the aspect of the present disclosure, in a case where the communication device receives, from the portable terminal, information indicating that the user requests to decrease the electric power of the first power feed, the electronic control unit may be configured to perform a control such that the power supply device decreases the electric power of the first power feed. In the case where a total of the electric power of the first power feed and predicted electric power of the second power feed at the time of a restart of the second power feed decreases to be less than the second threshold while the second power feed is stopped with the establishment of the second condition, the electronic control unit may be configured to perform a control such that the power supply device restarts the second power feed while continuing the first power feed.

According to the aspect of the present disclosure, the user operates the portable terminal inside or outside the vehicle cabin, thereby decreasing the total of the electric power of the first power feed and the predicted electric power of the second power feed at the time of the restart of the second power feed to be less than the second threshold and restarting she second power feed.

In the electrically powered vehicle according to the aspect of the present disclosure, the power supply device may be configured to output direct-current electric power. The first power feed may be direct-current power feed for performing control such that the direct-current electric power from the power supply device is supplied to the external equipment connected to the first outlet. The second power feed may be alternating-current power feed for performing control such that the direct-current electric power from the power supply device is convened to alternating-current electric power and the alternating-current electric power is supplied to the external equipment connected to the second outlet.

According to the aspect of the present disclosure, the direct-current power feed capable of outputting large electric power is given priority over the alternating-currant power feed, whereby it is possible to sufficiently secure electric power of the direct-current power feed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described in detail, referring to the drawings. The same or similar portions in the drawings are represented by the same reference numerals, and description thereof will not be repeated.

Figure 1:
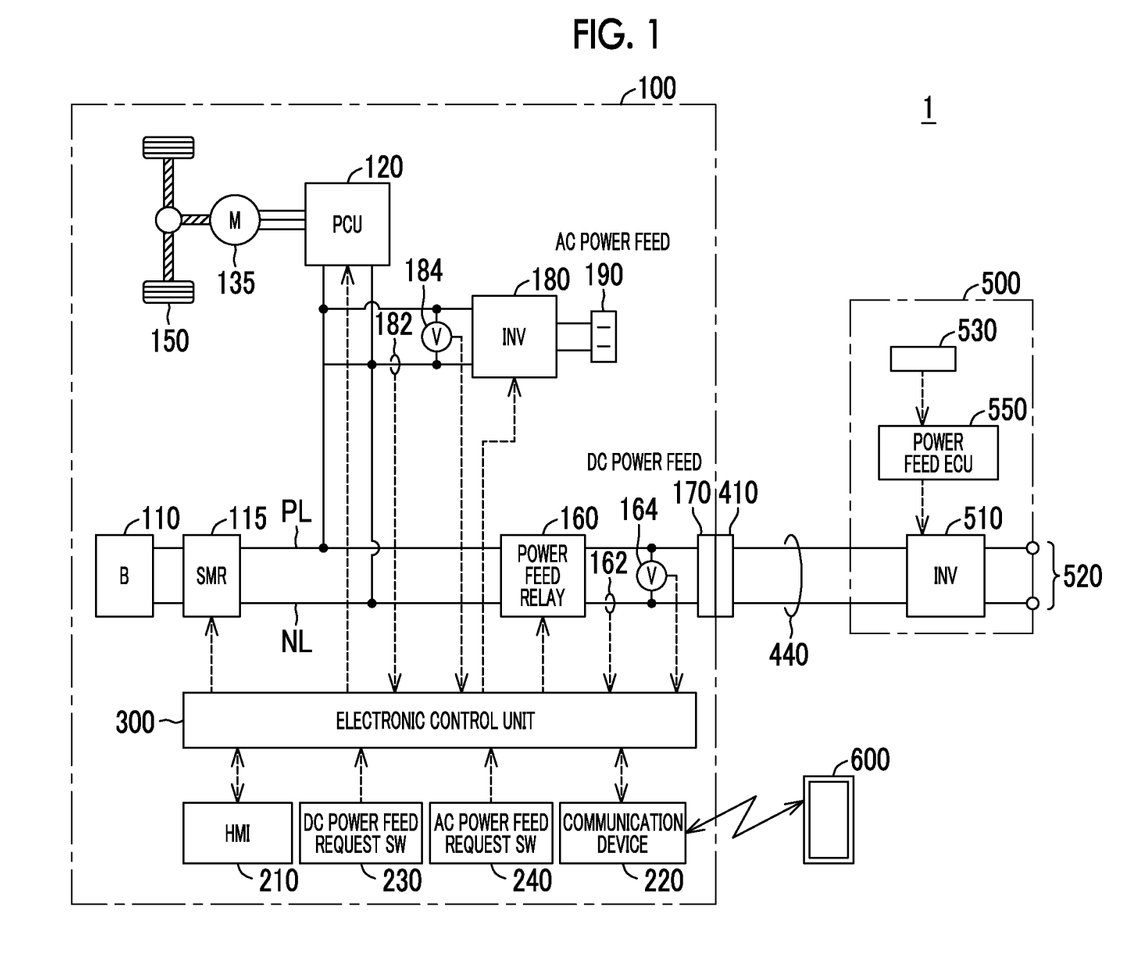
FIG. 1 is a diagram schematically showing the overall configuration of a power feed system.

FIG. 1 is a diagram schematically showing the overall configuration of a power feed system 1 according to the embodiment. The power feed system 1 according to the embodiment includes a vehicle 100, an external device 500 configured to be connectable to the vehicle 100, and a portable terminal 600 configured to be communicable with the vehicle 100.

The vehicle 100 includes a battery 110, a system main relay (SMR) 115, a power control unit (PCU) 120, a motor 135, drive wheels 150, a human machine interface (HMI) device 210, a communication device 220, and an electronic control unit 300.

The vehicle 100 is an electric vehicle (EV) that travels by driving the motor 135 with electric power of the battery 110.

The battery 110 is a rechargeable electric power storage device that stores electric power for driving the motor 135. The battery 110 is, for example, a secondary battery, such as a lithium-ion battery, a nickel-hydrogen battery, or a lead storage battery. As the electric power storage device, a capacitor may be employed instead of or in addition to the battery 110.

The battery 110 is connected to the PCU 120 through a pair of power lines PL, NL (positive power line PL and negative power line NL). Though not shown, the battery 110 is configured to be chargeable with electric power supplied from a power supply outside the vehicle. The battery 110 stores electric power regenerated by the motor 135. An output voltage of the battery 110 is, for example, 200 volts. In the embodiment, the battery 110 functions as a "power supply device" in a case of executing external power feed.

The SMR 115 is provided between the battery 110 and the power lines PL, NL, and is opened and closed based on a control signal from the electronic control unit 300. In a case where the SMR 115 is in a closed state, the battery 110 is connected to the power lines PL, NL.

The PCU 120 includes a converter that performs voltage conversion between the battery 110 and the motor 135, and an inverter that performs electric power conversion (conversion between direct current and alternating current) between the converter and the motor 135. The PCU 120 operates based on a control signal from the electronic control unit 300.

The motor 135 is an alternating-current rotating electric machine, and is, for example, a permanent magnet type synchronous electric motor including a rotor embedded with a permanent magnet. Drive torque of the motor 135 is transmitted to the drive wheels 150 to make the vehicle 100 travel. The motor 135 can generate electric power with rotation force of the drive wheels 150 at the time of regenerative braking of the vehicle 100. Then, generated electric power (alternating-current electric power) is converted to charging electric power (direct-current electric power) of the battery 110 by the PCU 120.

The HMI device 219 is a device that provides a user with information for assisting the operation of the vehicle 100. The HMI device 210 includes, for example, a display, a speaker, and the like provided in a vehicle cabin. As the HMI device 210, a display or a speaker of another existing device, for example, a navigation device (not shown) may be diverted.

The communication device 220 is configured to perform wireless communication with the portable terminal 600, such as a smartphone or a tablet, carried by the user directly or through a cloud server. The communication device 220 transmits information transmitted from the electronic control unit 300 to the portable terminal 600 or transmits information received from the portable terminal 600 to the electronic control unit 300. The communication device 220 may be configured to perform wireless communication with the external device 500.

The vehicle 100 includes, two systems of devices, as a device that performs external power feed, and specifically, a DC power feed device that feeds direct-current electric power to external equipment, and an AC power feed device that feeds alternating-current electric power to external equipment.

The DC power feed device includes a power feed relay 160 and a DC outlet 170. The power teed relay 160 is provided between the power lines PL, NL and the DC outlet 170, and is opened and closed according to a control signal from the electronic control unit 300. In a case where the SMR 115 and the power feed relay 100 are both in a closed state, direct-current electric power from the battery 110 is output to the DC outlet 170 through the power feed relay 160. The DC outlet 170 is configured to be connectable to a connector 410 of the external device 500 as external equipment. Direct-current electric power received from the power feed relay 160 by the DC outlet 170 is supplied to the external device 500 through the connector 410 and a power cable 440.

The AC power feed device includes an inverter 180 and an AC outlet 190. The inverter 180 is provided between the power lines PL, NL and the AC outlet 190. The inverter 180 operates according to a control signal from the electronic control unit 300, converts direct-current electric power from the battery 110 to alternating-current electric power, and outputs alternating current electric power to the AC outlet 190. Alternating-current electric power received from the inverter 180 by the AC outlet 190 is supplied to external equipment (for example, a charger for a portable terminal, such as a personal computer or a portable terminal 600) (not shown) connected to the AC outlet 190. In FIG. 1, an example where the AC outlet 190 is provided in the vehicle cabin is shown. Accordingly, the AC power feed is performed for external equipment carried in the vehicle cabin.

While the AC power feed is provided assuming that comparatively small electric power is supplied, the DC power feed is provided assuming that comparatively large electric power is supplied to housing or the like. For this reason, the maximum electric power (suppliable electric power) of the DC power feed is set to a value (for example, about 9 kW) greater than the maximum electric power (for example, about 1.5 kW) of the AC power feed.

The vehicle 100 further includes a current sensor 162 and a voltage sensor 164 that detect electric power (hereinafter, referred to as "DC power feed electric power") output from the DC outlet 170. The vehicle 100 further includes a current sensor 182 and a voltage sensor 184 that detect electric power (hereinafter, referred to as "AC power feed electric power") output from the AC outlet 190. The sensors transmit detection results to the electronic control unit 300.

The vehicle 100 further includes a DC power reed request switch 230 and an AC power feed request switch 240.

The DC power feed request switch 230 is a switch that is used when the user requests for the DC power feed, in a case where the DC power feed request switch 230 is operated by the user, the electronic control unit 300 brings the SMR 135 and the power feed relay 160 in the closed state to start the DC power feed from the DC outlet 170 to the external device 500.

The AC power feed request switch 240 is a switch that is used when the user requests for the AC power feed. In a case where the AC power feed request switch 240 is operated by the user, the electronic control unit 300 brings the SMR 115 in the closed state and operates the inverter 180 to start the AC power feed from the AC outlet 190.

The electronic control, unit 300 is embedded with a central processing unit (CPU) and a memory (not shown), and controls the devices (the PCU 120, the SMR 115, the power feed relay 160, the inverter 180, the communication device 220, the HMI device 210, and the like) of the vehicle 100 based on information stored in the memory or information from the sensors.

The external device 500 is configured to be connectable to the DC outlet 170 through the connector 410 and the power cable 440. The external device 500 includes an inverter 510, an output unit 520, an operating unit 530, and a power feed electronic control unit (ECU) 550. The inverter 510 converts direct-current electric power received from the DC outlet 170 to alternating-current electric power and outputs alternating-current electric power to the output unit 520. The output unit 520 is connected to alternating-current electrical equipment, a switchboard of a house, or the like. The operating unit 530 receives a power feed start operation, a power feed stop operation, or the like from the user. The power feed ECU 550 controls the inverter 510 according to an operation of the operating unit 530. With this, power feed from the external device 500 to the electrical equipment connected to the output unit 520 is controlled.

Securing of DC Power Feed Electric Power

In the vehicle 100 according to the embodiment, an output upper limit value of an entire external power feed device (hereinafter, simply referred to as an "entire device"), including the DC power feed device and the AC power feed device is set. The output upper limit value of the entire device cart be determined in advance, for example, in consideration of legal regulations or the like.

In a case where the DC power feed and the AC power feed are executed simultaneously in the vehicle 100, in a state in winch the DC power feed electric power is small, an output (the total of the DC power feed electric power and the AC power feed electric power) of the entire device becomes less than the output upper limit value of the entire device. However, in a state in which, the DC power feed electric power is large, there is a possibility that the output of the entire device exceeds the output upper limit value of the entire device.

For example, in a case where it is assumed that the output upper limit value of the entire device is 10 kW, the maximum electric power of the DC power feed is 9 kW, and the maximum electric power of the AC power feed is 1.5 kW, the total (10.5 kW) of the maximum electric power of the DC power feed and the maximum electric power of the AC power feed exceeds the output upper limit value (10 kW) of the entire device. Accordingly, for example, in a state in which the AC power feed electric power is 1.5 kW, in a case where the DC power feed electric power is less than 8.5 kW, the output of the entire device becomes less than the output upper limit value (1.0 kW) of the entire device. Meanwhile, in a case where the DC power feed electric power exceeds 8.5 kW, the output of the entire device exceeds the output upper limit value (10 kW) of the entire device.

In a case where the DC power feed electric power is limited to be less than the maximum electric power (for example, 9 kW described above) with the output of the entire device exceeding the output upper limit value of the entire device, a situation may occur in which DC electric power cannot be sufficiently supplied to the external device 500 that needs large electric power, and the use of the external device 500 cannot be continued. For example, in a case where a switchboard for housing is connected to the output unit 520 of the external device 500, there is a possibility that power failure occurs in housing.

Accordingly, the electronic control unit 300 according to the embodiment determines whether or not the DC power feed electric power exceeds a threshold while the DC power feed and the AC power feed are being executed simultaneously. The "threshold" is set to a value smaller than the output upper limit value of the entire device by a predetermined value (a value obtained by adding a predetermined margin to the maximum electric power of the AC power feed electric power) in order to determine whether or not there is a possibility that the total of the DC power feed electric power and the AC power feed electric power exceeds the output upper limit value of the entire device. Then, in a case where the DC power feed electric power exceeds the threshold while the DC power feed and the AC power feed are being executed simultaneously, the electronic control unit 300 temporarily stops the AC power feed and continues the DC power feed. In this way, the DC power feed capable of outputting large electric power is given priority over the AC power feed, whereby it is possible to sufficiently secure the DC power feed electric power and to continue the use of the external device 500 that needs large electric power. For example, in a case where a switchboard of a house is connected to the output unit 520 of the external device 500, it is possible to suppress an operation stop of a part of electrical equipment in the house.

As described above, in a case where the DC power feed electric power exceeds the threshold, the AC power feed is temporarily stopped in order to give priority to the DC power feed. However, the user may not notice that, the AC power feed is temporarily stopped, or may not know a reason that the AC power feed is temporarily stopped even when the user notices that the AC power feed is temporarily stopped and may feel uneasy.

Accordingly, in a case where the AC power feed is temporarily stopped with the DC power feed electric power exceeding the threshold while the DC power feed and the AC power feed are being executed simultaneously, in order to give priority to the DC power feed, the electronic control unit 300 according to the embodiment displays, on a screen of the HMI device 210, an image indicating that the AC power feed is temporarily stopped. With this, the user inside the vehicle cabin confirms the screen of the HMI device 210, thereby ascertaining that the AC power feed is temporarily stopped and that the reason that the AC power feed is temporarily stopped is because the DC power feed is given priority.

In a case where the user is outside the vehicle cabin, the user cannot confirm the screen of the HMI device 230. Accordingly, in a case where the AC power feed is temporarily stopped with the DC power feed electric power exceeding the threshold while the DC power feed and the AC power feed are being executed simultaneously the electronic control unit 300 transmits, to the portable terminal 600, information (hereinafter, referred to as "DC priority notification") for giving the user notification that the DC power feed is given priority and the AC power feed is temporarily stopped. With this, even in a case where the user is outside the vehicle cabin, the user can know, from the portable terminal 600 carried by the user, that the AC power feed is temporarily stopped and feed the reason that the AC power feed is temporarily stopped is because the DC power feed is given priority.

Figure 2:
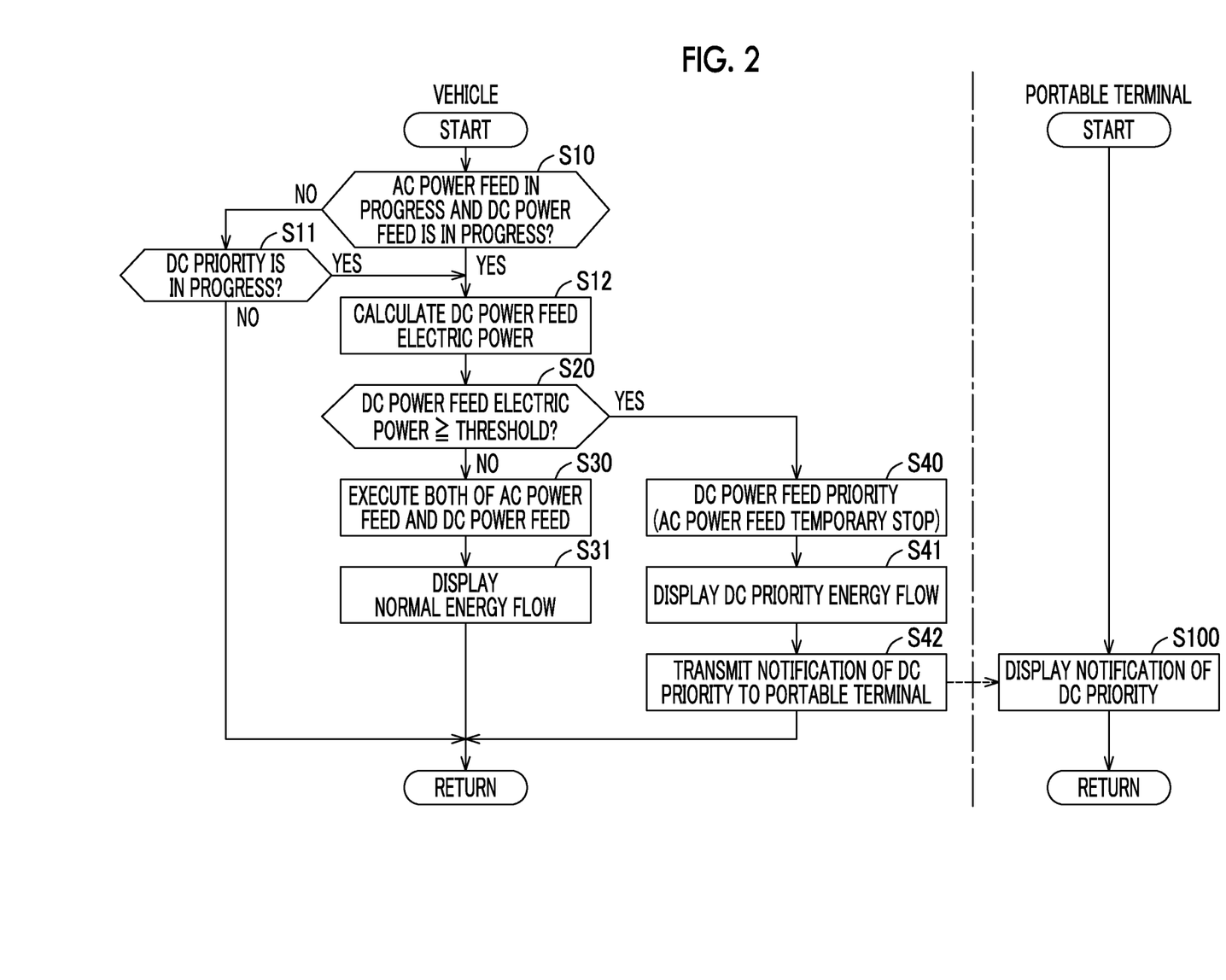
FIG. 2 is a flowchart (1) showing an example of a processing procedure that is executed by an electronic control unit of a vehicle and a portable terminal.

FIG. 2 is a flowchart showing an example of a processing procedure that is executed by the electronic control unit 300 and the portable terminal 600. The flowchart is repeatedly executed in a predetermined cycle.

In Step (hereinafter; Step is abbreviated as "S") 10, the electronic control unit 300 determines whether or not the AC power fend and the DC power feed are being executed.

In a case where the AC power feed is in progress and the DC power feed is not in progress (in S10, NO), the electronic control unit 300 determines whether or not DC power feed priority is in progress (AC power feed is temporarily stopped) according to processing of S40 described below is in progress (S11). In a case where the DC power feed priority is not in progress (in S11, NO), the electronic control unit 300 skips subsequent processing of S12 to S42 and ends the processing.

So a case where the AC power feed is in progress and the DC power feed is in progress (in S10, YES), or m a case where the DC power feed priority is in progress (in S11, YES), the electronic control unit 300 calculates the DC power feed electric power based on the detection results of the current sensor 162 and the voltage sensor 164 (S12).

Next, the electronic control unit 300 determines whether or not the DC power feed electric power is equal to or greater than the threshold (S20). The determination is processing for determining whether or not there is a possibility that the total of the DC power feed electric power and the AC power feed electric power exceeds the output upper limit value of the entire device. Accordingly, the "threshold" that is used in the processing of S20 is set to a value smaller than the output upper limit value of the entire device by a predetermined value.

In a case where the DC power feed electric power is less than the threshold (in S20, NO), the electronic control unit 300 continues both of the AC power feed and the DC power feed (S30). Next, the electronic control unit 300 displays a normal energy flow on the screen of the HMI device 210 (S31). Au example of a display image of the normal energy flow is shown in FIG. 3 described below.

Figure 4:
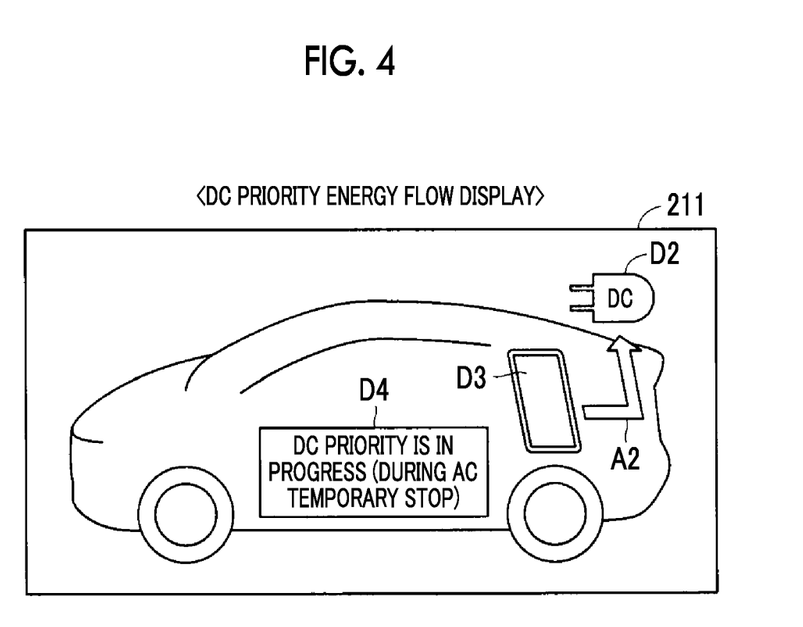
FIG. 4 is a diagram showing an example of a DC priority energy flow.

In a case where the DC power feed electric power is equal to or greater than the threshold (in S20, YES), the electronic control unit 300 temporarily stops the AC power feed and executes the DC power feed with priority (S40). Next, the electronic control unit 300 displays a DC priority energy flow on the screen of the HMI device 210 (S41). An example of a display image of the DC priority energy flow is shown in FIG. 4 described below.

Figure 5:
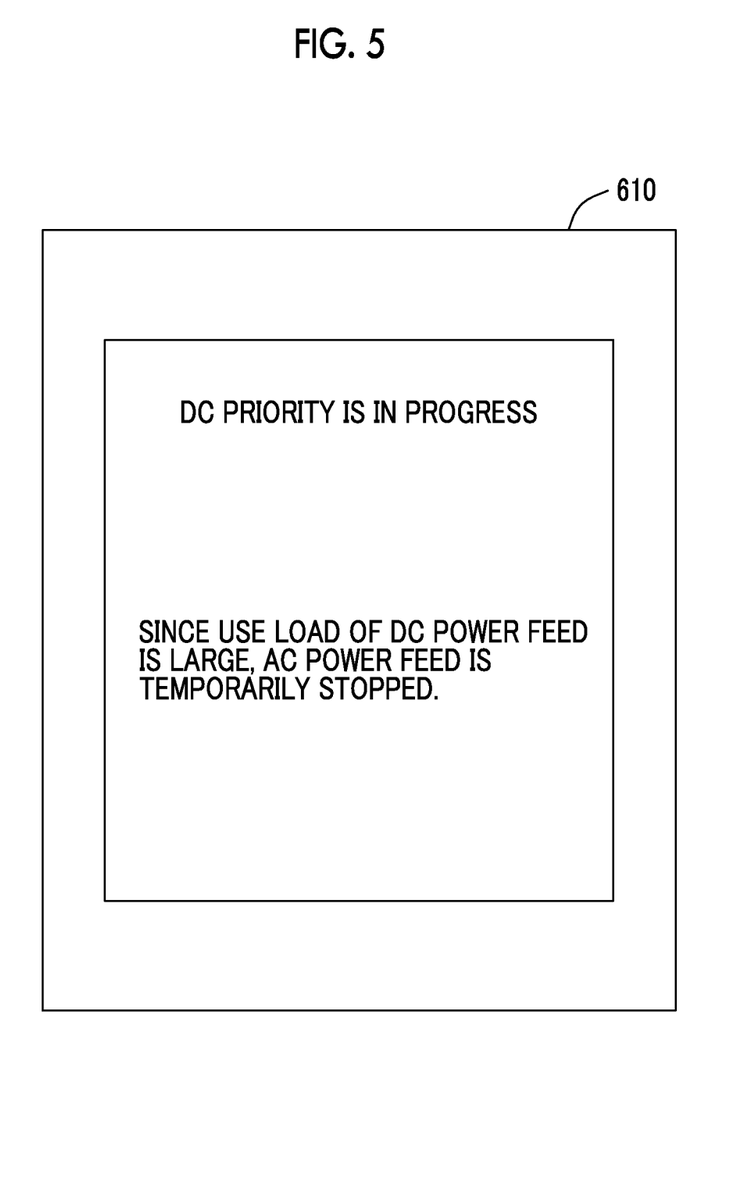
FIG. 5 is a diagram showing an example of a DC priority notification image.

Next, the electronic control unit 300 transmits the DC priority notification to the portable terminal 600 (S42). In a case where the DC priority notification is received from the vehicle 100, the portable terminal 600 displays a DC priority notification image on a screen of the portable terminal 600 (S100). An example of the DC priority notification image is shown in FIG. 5 described below.

Figure 3:
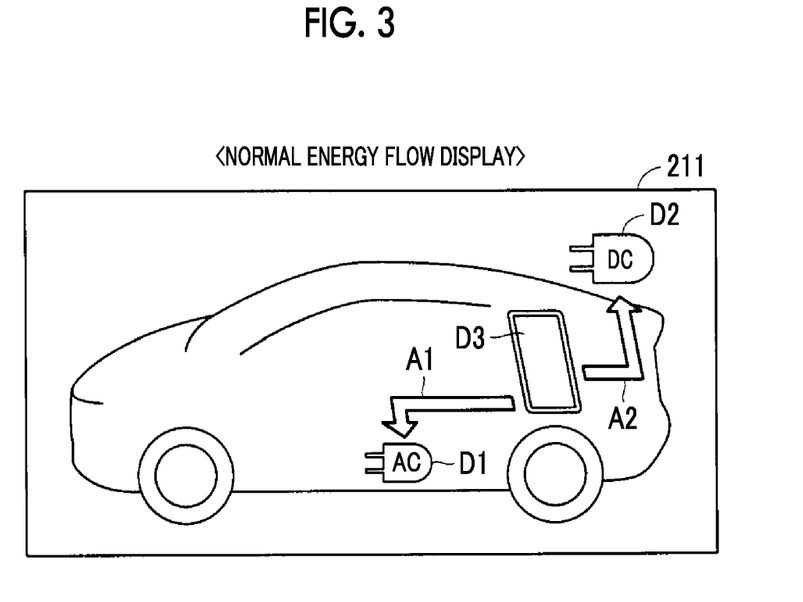
FIG. 3 is a diagram showing an example of a normal energy flow.

FIG. 3 is a diagram showing an example of the normal energy flow that is displayed on a screen 211 of the HMI device 210 according to the processing of S31 of FIG.

In the normal energy flow, an image D1 representing the AC outlet 190, an image D2 representing the DC outlet 170, an image D3 representing the battery 110, an image A1 representing that the AC power feed is being executed, and an image A2 representing that the DC power feed is being executed are displayed on the screen 211 of the HMI device 210. As shown in FIG. 3, in the embodiment, the image A1 is represented by an arrow (an arrow from the image D3 toward the image D1) indicating the flow of electric power of the AC power feed, and the image A2 is represented by an arrow (an arrow from the image D3 toward the image D2) indicating the flow of electric power of the DC power feed. The user inside the vehicle cabin confirms that the images A1, A2 are displayed on the screen 211 of the HMI device 210, thereby ascertaining that the AC power feed and the DC power feed are being executed simultaneously.

FIG. 4 is a diagram showing an example of the DC priority energy flow that is displayed on the screen 211 of the HMI device 210 according to the processing of S41 of FIG. 2.

In the DC priority energy flow the image D2 representing the DC outlet 170, the image D3 representing the battery 110, the image A2 representing that the DC power feed is being executed, and an image D4 representing that the DC priority is in progress are displayed on the screen 211 of the HMI device 210. That is, in the DC priority energy flow, the image D1 representing the AC outlet 190 and the image A1 representing tire AC power feed being executed displayed in the normal energy flow are erased, and the image D4 representing that the DC priority is in progress is displayed instead of the erased images. The user inside the vehicle cabin confirms that the images D1, A1 are erased and the image D4 is displayed instead from the screen 211 of the HMI device 210, thereby ascertaining that the AC power feed is temporarily stopped and that the reason that the AC power feed is temporarily stopped is because the DC power feed is given priority.

FIG. 5 is a diagram showing an example of the DC priority notification image that is displayed on a screen 610 of the portable terminal 600 according to the processing of S100 of FIG. 2. As shown in FIG. 5, in the DC priority notification image, a message image representing that the DC priority is in progress and a message image representing that the AC power feed is temporarily stopped are displayed on the screen 610 of the portable terminal 600. With this, even in a ease where the user is outside the vehicle cabin, the user confirms the screen 610 of the portable terminal 600 earned by the user, thereby ascertaining that the AC power feed is temporarily stopped and that the reason that the AC power feed is temporarily stopped is because the DC power feed is given priority.

Figure 6:
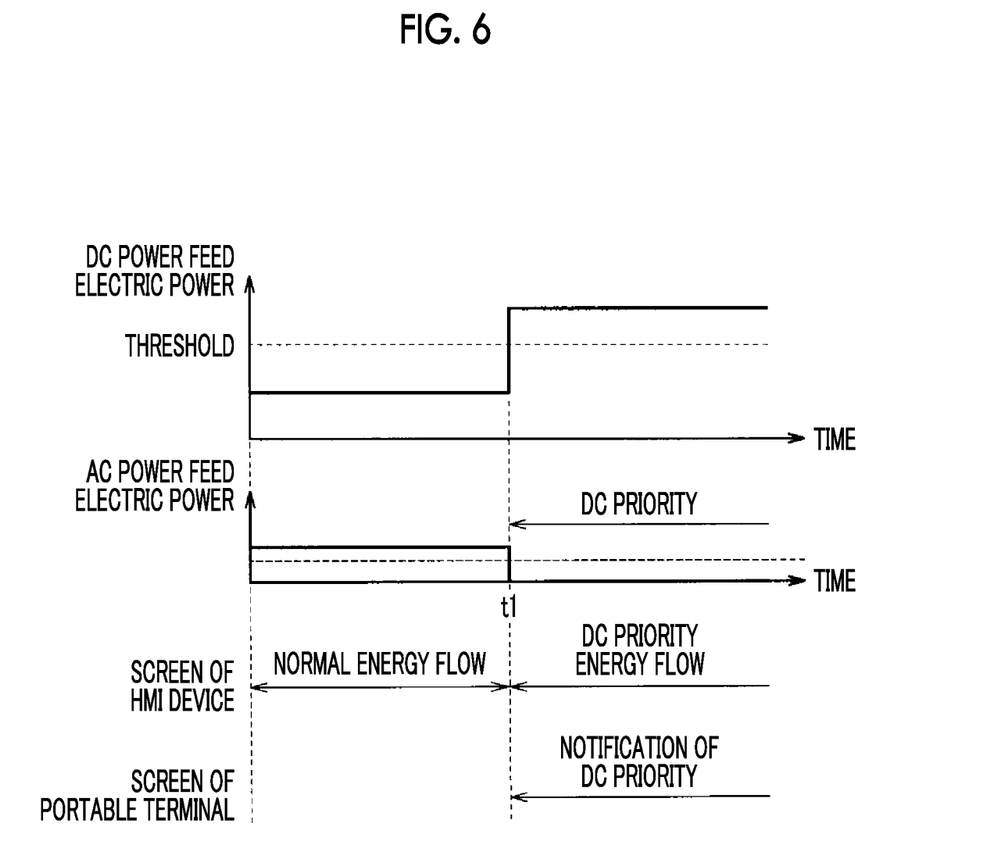
FIG. 6 is a diagram showing an example of change tonus of DC power feed electric power, AC power feed electric power, a screen display of an HMI device, and a screen display of the portable terminal.

FIG. 6 is a diagram showing an example of change forms of the DC power feed electric power the AC power feed electric power, a screen display of the HMI device 210, and a screen display of the portable terminal 600. Before time t1, both of the AC power feed and the DC power feed are executed. In this case, the normal energy flow (see FIG. 3) is displayed on the semen of the HMI device 210.

At time t1, in a case where the DC power feed electric power exceeds the threshold, the AC power feed is temporarily stopped, and the DC power feed is given priority. In this case, the DC priority energy flow (see FIG. 4) is displayed on the screen of the HMI device 210. The DC priority notification image (see FIG. 5) is displayed on the screen of the portable terminal 600.

As described above, in a case where the DC power feed electric power exceeds the threshold while the DC power feed and the AC power feed am being executed simultaneously (that is, in a case where there is a possibility that the total of the DC power feed electric power and the AC power feed, electric power exceeds the output upper limit value of the satire device), the electronic control unit 300 according to the embodiment temporarily stops the AC power feed and continues the DC power feed. In this way, the DC power feed capable of outputting large electric power is given priority over the AC power feed, whereby it is possible to sufficiently secure the DC power feed electric power, and to continue the use of the external device 500 that needs large electric power.

In a case where the AC power feed is temporarily stopped with the DC power feed electric power exceeding the threshold while the DC power feed and the AC power feed are being executed simultaneously, in order to give priority to the DC power feed, the electronic control unit 300 according to the embodiment displays, on the screen of the HMI device 210, the image (DC priority energy flow, see FIG. 4) indicating that the AC power feed is temporarily stopped. With this, the user inside the vehicle cabin confirms the screen of the HMI device 210, thereby ascertaining that the AC power feed is temporarily stopped and that the reason that the AC power feed is temporarily stopped is because the DC power feed is given priority.

In a case where the AC power feed is temporarily stopped with the DC power feed electric power exceeding the threshold while the DC power feed and the AC power feed are being executed simultaneously, the electronic control unit 300 according to the embodiment transmits the DC priority notification to the portable terminal 600. With this, the DC priority notification image (see FIG. 5) is displayed on the screen of the portable terminal 600. For this reason, even in a case where the user is outside the vehicle cabin, the user confirms the screen of the portable terminal 600 carried by the user, thereby ascertaining that the AC power feed is temporarily stopped and that the reason that the AC power feed is temporarily stopped is because the DC power feed is given priority.

The above-described embodiment can be modified as follows, for example.

Modification Example 1

In the above-described embodiment, the user confirms the screen of the HMI device 210 or the portable terminal 600, thereby ascertaining that the AC power feed is temporarily stopped.

It is supposed that the user who ascertains that the AC power feed is temporarily stopped desires to restart the AC power feed early. Accordingly, in Modification Example 1, a configuration is made in which the user who ascertains that the AC power feed is temporarily stopped operates the portable terminal 600, thereby decreasing the DC power feed electric power to be less than the threshold to restart the AC power feed.

Figure 7:
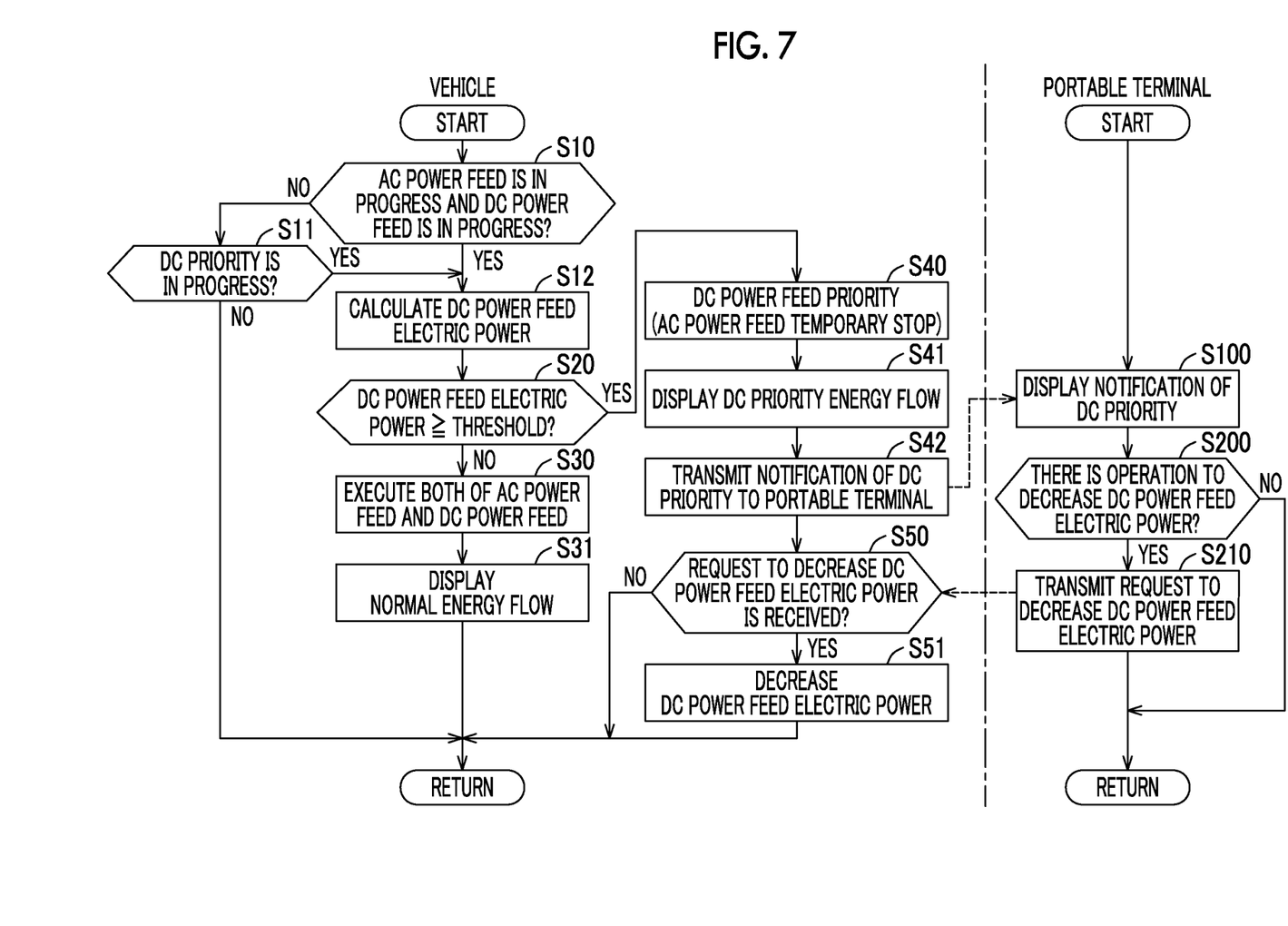
FIG. 7 is a flowchart (2) showing an example of a processing procedure that is executed by the electronic control unit of the vehicle and the portable terminal.

FIG. 7 is a flowchart showing an example of a processing procedure that is executed by the electronic control unit 300 and the portable terminal 600 according to Modification Example 1. The flowchart of FIG. 7 is different from the flowchart of FIG. 3 described above in that S200 and S210 that are executed by the portable terminal 600 and S50 and S51 that are executed by the electronic control unit 300 are added. Other steps (the steps represented by the same numerals) are already described in the description of FIG. 3, and thus, detailed description thereof will not be repeated.

The portable terminal 600 executes the processing (S100) for displaying the DC priority notification image on the screen of the portable terminal 600, and then, determines whether or not the user performs an operation to request to decrease the DC power feed electric power on the portable terminal 600 (S200). In a case where the user does not perform an operation to request to decrease the DC power feed electric power on the portable terminal 600 (in S200, NO), the portable terminal 600 skips processing of S210 and ends the processing.

In a case where the user performs an operation to request to decrease the DC power feed electric power on the portable terminal 600 (in S200, YES), the portable terminal 600 transmits a signal (hereinafter, referred to as a "DC power feed electric power decrease request") for requesting to decrease the DC power feed electric power to be less than the threshold to the vehicle 100.

The electronic control unit 300 of the vehicle 100 executes the processing (S42) for transmitting the DC priority notification, to the portable terminal 600, and then, determines whether or not the DC power feed electric power decrease request is received from the portable terminal 600 (S50). In a case where the PC power feed electric power decrease request is not received from the portable terminal 600 (in S50, NO), the electronic control unit 300 skips processing of S51 and ends the processing.

In a case where the DC power feed electric power decrease request is received from the portable terminal 600 (in S50, YES), the electronic control unit 300 executes processing for decreasing the DC power feed electric power to be less than the threshold (S51). With this, in a case where determination is made that the DC power feed electric power is less than the threshold in a cycle from the next time (in S20, NO), the AC power feed is restarted while the DC power feed is continued (S30).

As described above, in Modification Example 1, the user who ascertains that the AC power feed is temporarily stopped operates the portable terminal 600 inside the vehicle cabin or outside the vehicle cabin, thereby decreasing the DC power feed electric power to be less than the threshold. For this reason, it is possible to allow the user to restart the AC power feed with a user's operation.

Modification Example 2

The normal energy flow (FIG. 3) and the DC priority energy flow (FIG. 4) described in the above-described embodiment are merely examples and may be modified.

Figure 8:
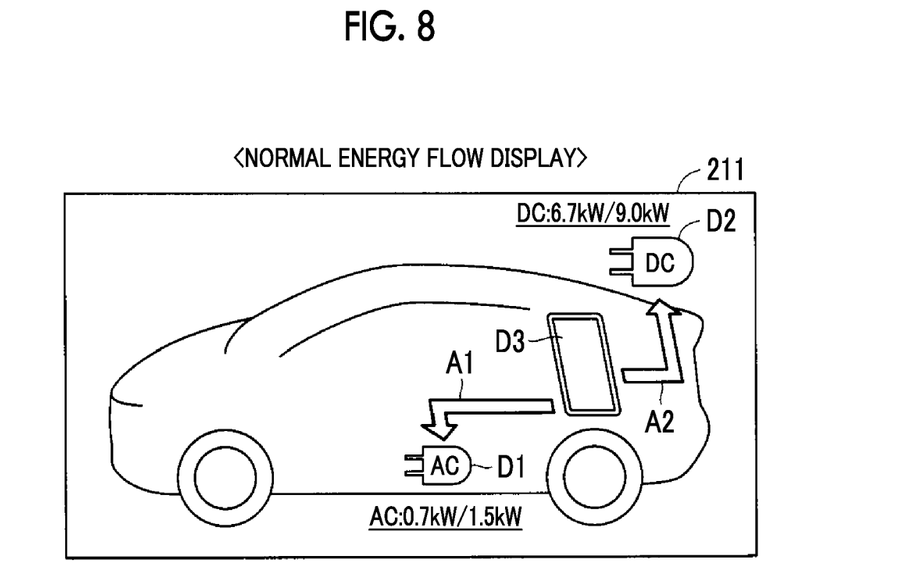
FIG. 8 is a diagram showing a modification example of a display image of the normal energy flow.

FIG. 8 is a diagram showing a modification example of the display image of the normal energy flow. An image shown in FIG. 8 includes a display of the AC power feed electric power and the maximum electric power of the AC power feed (in the example shown in FIG. 8, 0.7 kW/1.5 kW) below the image D1 representing the AC outlet 190 in addition to the image shown in FIG. 3 described above. The image shown in FIG. 8 further includes a display of the DC power feed electric power and the maximum electric power of the DC power feed (in the example shown in FIG. 8, 6.7 kW/9.0 kW) above the image D2 representing the DC outlet 170. With such a display, the user can more accurately ascertain the situations of the AC power feed and the DC power feed.

Figure 9:
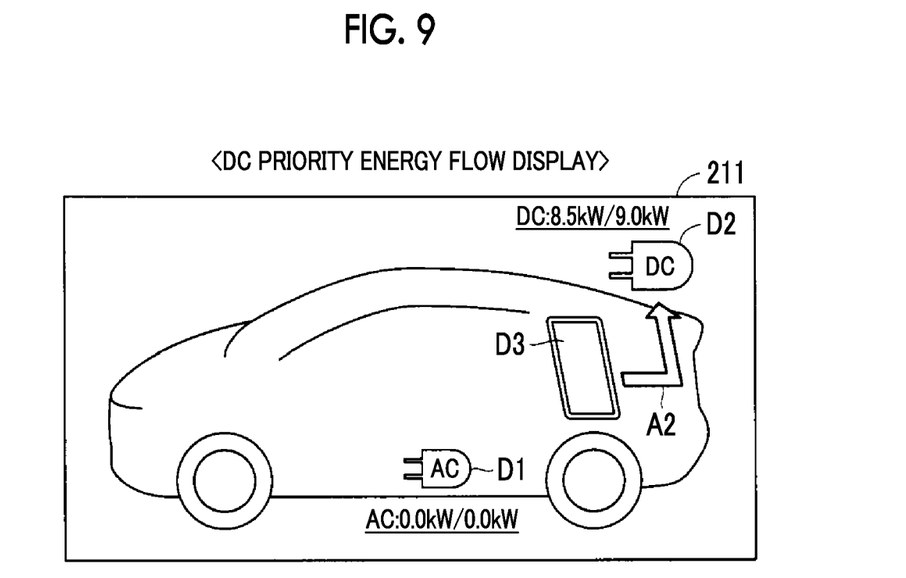
FIG. 9 in a diagram showing a modification example of a display image of the DC priority energy flow.

FIG. 9 is a diagram showing a modification example of the display image of the DC priority energy flow. An image shown in FIG. 9 includes a display of the DC power feed electric power and the maximum electric power of the DC power feed (in the example shown in FIG. 9, 8.5 kW/9.0 kW) above the image D2 representing the DC outlet 170 in addition to the image shown in FIG. 4 described above. The image D1 representing the AC outlet 100 is displayed instead of the image D4 representing that the DC priority is in progress, and displays of the AC power feed electric power (in she example shown in FIG. 9, 0 kW) and the maximum electric power of the AC power feed (in the example shown in FIG. 9, 1.5 kW) is added below the image D1 representing the AC outlet 190. With such a display, the user can ascertain that the AC power feed is temporarily stopped, and can more accurately ascertain the situation of the DC power feed.

Modification Example 3

In the above-described embodiment, determination is made whether or not the "DC power feed electric power" exceeds the threshold while the DC power feed and the AC power feed are being executed simultaneously, and determination is made whether or not to temporarily stop the AC power feed according to the determination result (see S20 of the flowchart of FIG. 3).

In contrast, in Modification Example 3, determination is made whether or not "the total of the DC power feed electric power and the AC power feed electric power" exceeds a total threshold while the DC power feed and the AC power feed are being executed simultaneously, and determination is made whether or not to temporarily stop the AC power feed according to the determination result. The "total threshold" is set to a value smaller than the output upper limit value of the entire device by a predetermined value in order to determine whether or not there is a possibility that the total of the DC power feed electric power and the AC power feed electric power exceeds the output upper limit value of the entire device.

Figure 10:
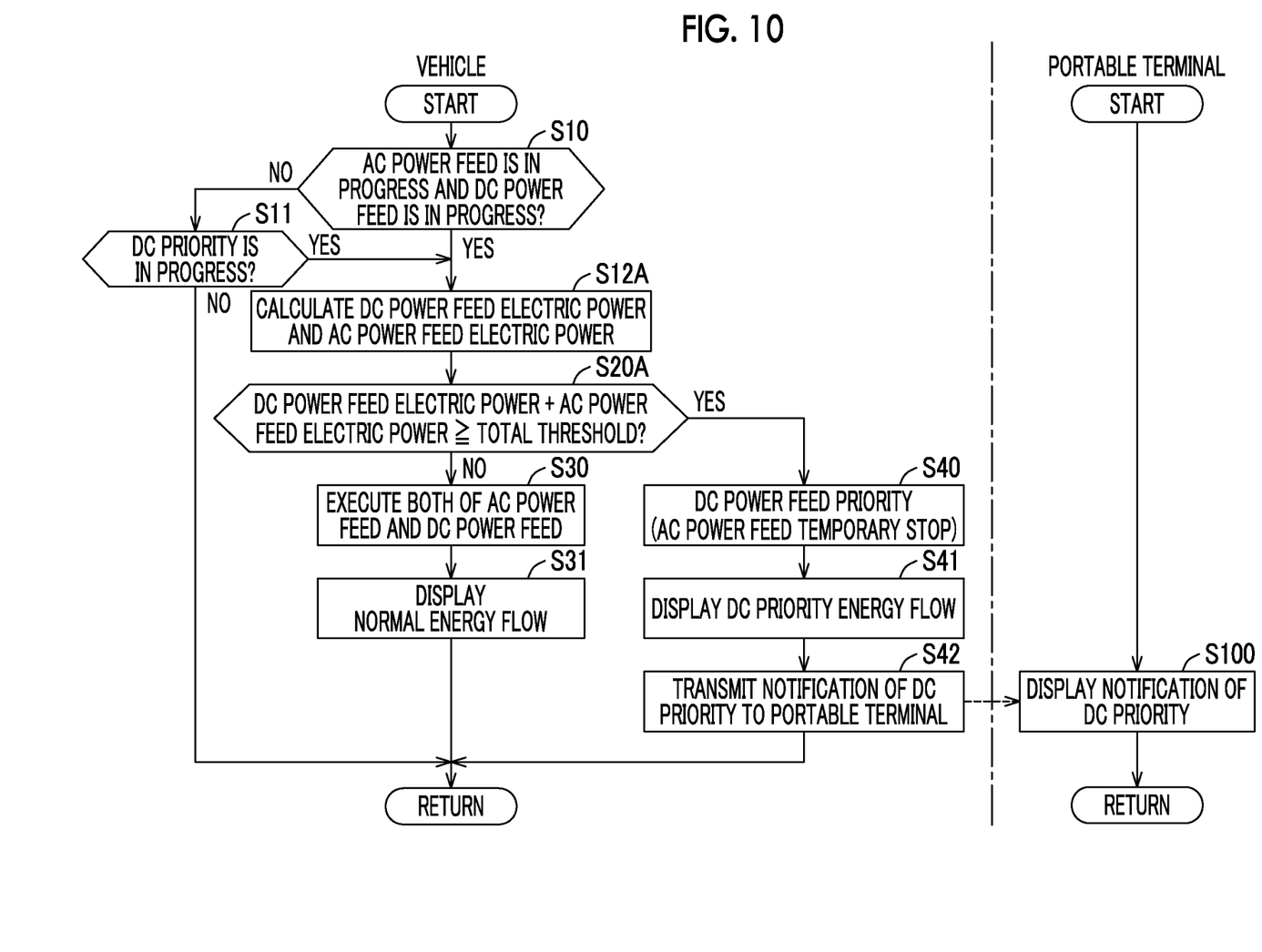
FIG. 10 is a flowchart (3) showing an example of a processing procedure that is executed by the electronic control unit of the vehicle and the portable terminal.

FIG. 10 is a flowchart showing an example of a processing procedure that is executed by the electronic control unit 300 and the portable terminal 600 according to Modification Example 3. The flowchart of FIG. 10 is different from the flowchart of FIG. 3 described above in that S12 and S20 are changed to S12A and S20A, respectively. Other steps (the steps represented by the same numerals) are already described in the description of FIG. 3, and thus, detailed description thereof will not be repeated.

In a case where the AC power feed is in progress and the DC power feed is in progress (in S10, YES) or in a case where the DC power feed priority is in progress (in S11, YES), the electronic control unit 300 calculates the DC power feed electric power based on the detection results of the current sensor 162 and the voltage sensor 164, and calculates the AC power feed electric power (S12A). In the above-described processing, the electronic control unit 300 switches a calculation method of the AC power feed electric power according to whether the AC power feed is in progress and the DC power feed is in progress or the DC power feed priority is in progress. Specifically, in a case where the AC power feed is in progress and the DC power feed is in progress, the electronic control, unit 300 calculates the AC power feed electric power based on the detection results of the current sensor 182 and the voltage sensor 184. In a case where the DC power feed priority is in progress, the electronic control unit 300 calculates predicted electric power of the AC power feed when it is assumed that the AC power feed is restarted. The predicted electric power of the AC power feed may be, for example, the maximum electric power of the AC power feed or a detected value of the AC power feed electric power immediately before the AC power feed is temporarily stopped.

Next, the electronic control unit 300 determines whether or not the total of the DC power feed electric power and the AC power feed electric power calculated in S12A is equal to or greater than the above-described total threshold (S20A).

Then, in a case where the total of the DC power feed electric power and the AC power feed electric power is less than the total threshold (in S20A, NO), the electronic control unit 300 continues both of the AC power feed and the DC power feed (S30). In a case where the total of the DC power feed electric power and the AC power feed electric power is equal to or greater than the total threshold (in S20A, YES), the electronic control unit 300 temporarily stops the AC power feed and executes the DC power feed with priority (S40).

As described above, in Modification Example 3, determination is made whether or not "the total of the DC power feed electric power and the AC power feed electric power" exceeds the total threshold while the DC power feed and the AC power feed are being executed simultaneously, and determination is made whether or not to temporarily stop the AC power feed according to the determination result. In this way, since determination can be performed in consideration of not only actual DC power feed electric power but also actual AC power feed electric power, it is possible to determine whether or not there is a possibility that the total of the DC power feed electric power and the AC power feed electric power exceeds the output upper limit value of the entire device with higher accuracy.

Modification Example 3 may be combined with Modification Example 1, That is, in a case where the user performs an operation to request to decrease the DC power feed electric power on the portable terminal 600, the portable terminal 600 transmits a signal for requesting to decrease the DC power feed electric power to the vehicle 100. Then, in a case where the signal for requesting to decrease the DC power feed electric power is received from the portable terminal 600, the electronic control unit 300 of the vehicle 100 executing processing for decreasing the DC power feed electric power such that, the total of the DC power feed electric power and the predicted electric power of the AC power feed becomes less than the total threshold. With this, the user operates the portable terminal 600, thereby decreasing the total of the DC power feed electric power and the predicted electric power of the AC power feed to be less than the total threshold. For this reason, it is possible to allow She user to restart the AC power feed wish a user's operation.

Modification Example 4

In the above-described embodiment, although the vehicle 100 that is simultaneously executable the DC power feed and the AC power feed has been described, a combination of external power feed that is simultaneously executable by the vehicle 100 may be a combination of two systems of external power feed with different maximum electric power, and is not necessarily limited to a combination of the DC power feed and the AC power feed.

For example, a combination of external power feed that is simultaneously executable by the vehicle 100 may be a combination of DC power feed with different maximum electric power, or may be a combination of AC power feed with different maximum electric power.

Modification Example 5

In the above-described embodiment, the vehicle 100 is an electric vehicle (EV), and the battery 110 functions, as a "power supply device" in a case of executing external power feed.

However, the vehicle that the present disclosure is applicable is not limited to an electric vehicle (EV), and may be a hybrid vehicle (Plug-in Hybrid Vehicle (PHV)) or a fuel cell vehicle (FCV).

In a hybrid vehicle, in general, a generator that generates electric power using power of an engine is mounted in addition to an electric power storage device. Accordingly, in the hybrid vehicle, one or both of the in-vehicle electric power storage device and the generator functions as a "power supply device" in a ease of executing external power feed.

In a fuel cell vehicle, a fuel cell that generates electric power using hydrogen as fuel is mounted in addition to an electric power storage device. Accordingly, in the fuel cell vehicle, one or both of the in-vehicle electric power storage device and the fuel cell functions as a "power supply device" in a case of executing external power feed.

The embodiment and the modification examples described above can be suitably combined as long as no technical inconsistency occurs.

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. An electrically powered vehicle comprising:
a power supply device;
a first outlet configured to be connected to an external equipment that is not constituent equipment of the electrically powered vehicle;
a second outlet configured to be connected to an external equipment that is not constituent equipment of the electrically powered vehicle; and
an electronic control unit configured to
execute first power feed for performing a control such that the power supply device feeds electric power from the power supply device to the external equipment connected to the first outlet,
execute second power feed for performing a control such that the power supply device feeds electric power from the power supply device to the external equipment connected to the second outlet, maximum electric power of the second power feed being smaller than maximum electric power of the first power feed, and
in a case where a first condition is established while the first power feed and the second power feed are being executed, perform a control such that the power supply device stops the second power feed and continues the first power feed, the first condition being a condition that electric power of the first power feed exceeds a first threshold, and
in a case where a second condition is established while the first power feed and the second power feed are being executed, perform a control such that the power supply device stops the second power feed and continues the first power feed, the second condition being a condition that total electric power of the first power feed and the second power feed exceed a second threshold.

2. The electrically powered vehicle: according to claim 1, further comprising a display device configured to display an image,
wherein, in a case where the first condition or the second condition is established and the second power feed is stopped, the electronic control unit is configured to perform a control such that the display device displays an image indicating that the second power feed is stopped.

3. The electrically powered vehicle according to claim 1, further comprising a communication device configured to execute communication with a portable terminal carried by a user,
wherein, in a case where the first condition or the second condition is established and the second power feed is stopped, the electronic control unit is configured to perform a control such that the communication device transmits, to the portable terminal, information for giving the user notification that the second power feed is stopped.

4. The electrically powered vehicle according to claim 3, wherein:
in a case where the communication device receives, from the portable terminal, information indicating that the user requests to decrease the electric power of the first power feed, the electronic control unit is configured to perform a control such that the power supply device decreases the electric power of the first power feed; and
in a case where the electric power of the first power feed decreases to be less than the first threshold while the second power feed is stopped with the establishment of the first condition, the electronic control unit is configured to perform a control such that the power supply device restarts the second power feed while continuing the first power feed.

5. The electrically powered vehicle according to claim 1, wherein;
in a case where the communication device receives, from the portable terminal, information indicating that the user requests to decrease the electric power of the first power feed, the electronic control unit is configured to perform a control such that the power supply device decreases the electric power of the first power feed; and
in a case where a total of the electric power of the first power feed and predicted electric power of the second power feed at the time of a restart of the second power feed decreases to be less than the second threshold while the second power feed is stopped with the establishment of the second condition, the electronic control unit is configured to perform a control such that the power supply device restarts the second power feed while continuing the first power feed.

6. The electrically powered vehicle according to claim 1, wherein:
the power supply device is configured to output direct-current electric power,
the first power feed is direct-current power feed for performing control such that the direct-current electric power from the power supply device is supplied to the external equipment connected to the first outlet; and
the second power feed is alternating-current power feed for performing control such that the direct-current electric power from the power supply device is converted to alternating-current electric power and the alternating-current electric power is supplied to the external equipment connected to the second outlet.

* * * * *

UNITED STATES PATENT AND TRADEMARK OFFICE
CERTIFICATE OF CORRECTION

PATENT NO. : 10,696,179 B2
APPLICATION NO. : 15/783521
DATED : June 30, 2020
INVENTOR(S) : Daisuke Ueo and Keisuke Kanamaru It is certified that error appears in the above-identified patent and that said Letters Patent is hereby corrected as shown below:

In the Specification

In Column 1, Line(s) 14, after "vehicle", insert --,--.

In Column 1, Line(s) 16, after "hereinafter", insert --,--.

In Column 1, Line(s) 28, after "generator", insert --,--.

In Column 1, Line(s) 67, delete "output," and insert --output--, therefor.

In Column 2, Line(s) 43, delete "ease" and insert --case--, therefor.

In Column 3, Line(s) 2, delete "earned" and insert --carried--, therefor.

In Column 3, Line(s) 27, after "such", delete ",".

In Column 3, Line(s) 57, delete "she" and insert --the--, therefor.

In Column 4, Line(s) 28, delete "tonus" and insert --forms--, therefor.

In Column 4, Line(s) 46, after "detail", delete ",".

In Column 6, Line(s) 40, delete "feed, in" and insert --feed. In--, therefor.

In Column 7, Line(s) 22, after "which", delete ",".

In Column 8, Line(s) 4, after "power", insert --,--.

In Column 8, Line(s) 14, after "that", delete ",".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,696,179 B2

In Column 8, Line(s) 37, after "simultaneously", insert --,--.

In Column 8, Line(s) 45, delete second instance of "feed" and insert --that--, therefor.

In Column 8, Line(s) 54, delete "fend" and insert --feed--, therefor.

In Column 8, Line(s) 64, before "case", delete "So a" and insert --In a--, therefor.

In Column 8, Line(s) 65, after "or", delete "m" and insert --in--, therefor.

In Column 9, Line(s) 18, delete "Au" and insert --An--, therefor.

In Column 9, Line(s) 37, after "FIG.", insert --2.--.

In Column 9, Line(s) 58, after "flow", insert --,--.

In Column 10, Line(s) 16, delete "ease" and insert --case--, therefor.

In Column 10, Line(s) 18, delete "earned" and insert --carried--, therefor.

In Column 10, Line(s) 23, after "power", insert --,--.

In Column 10, Line(s) 28, delete "semen" and insert --screen--, therefor.

In Column 10, Line(s) 41, after "feed", delete ",".

In Column 10, Line(s) 42, delete "satire" and insert --entire--, therefor.

In Column 11, Line(s) 56, after "notification", delete ",".

In Column 12, Line(s) 39, delete "AC outlet 100" and insert --AC outlet 190--, therefor.

In Column 12, Line(s) 42, delete "she" and insert --the--, therefor.

In Column 13, Line(s) 27, after "control", delete ",".

In Column 14, Line(s) 16, delete "She" and insert --the--, therefor.

In Column 14, Line(s) 38, after "functions", delete ",".

In Column 14, Line(s) 51, delete "ease" and insert --case--, therefor.

CERTIFICATE OF CORRECTION (continued)
U.S. Pat. No. 10,696,179 B2

In the Claims

In Column 16, Line(s) 21, Claim 5, delete "wherein;" and insert --wherein:--, therefor.

In Column 16, Line(s) 40, Claim 6, delete "power," and insert --power;--, therefor.